(12) United States Patent
Plucknett (10) Patent No.: US 7,600,326 B2
(45) Date of Patent: Oct. 13, 2009

(54) INSTRUMENT FOR DUPLICATING COMPLEX SHAPES

(76) Inventor: Bruce W. Plucknett, 850 NE. County Line Rd., Sadieville, KY (US) 40370

( * ) Notice: Subject to any disclaimer, the term of this patent is extended or adjusted under 35 U.S.C. 154(b) by 133 days.

(21) Appl. No.: 11/849,510

(22) Filed: Sep. 4, 2007

(65) Prior Publication Data

US 2009/0056159 A1    Mar. 5, 2009

(51) Int. Cl.
    *G01B 3/10* (2006.01)
(52) U.S. Cl. .................................. 33/760; 33/27.032
(58) Field of Classification Search ........... 33/759–761,
         33/755, 764, 768–770, 435, 452, 471–473,
                      33/538, 534, 561.1, 561.3, 518, 465
    See application file for complete search history.

(56) References Cited

U.S. PATENT DOCUMENTS

| 1,577,569 | A | | 3/1926 | Donley |
|---|---|---|---|---|
| 2,599,050 | A | | 6/1952 | Emerson |
| 2,726,451 | A | | 12/1955 | Johnson |
| 2,796,665 | A | | 6/1957 | Cossock |
| 4,285,135 | A | | 8/1981 | Minozzi, Jr. |
| 4,423,555 | A | | 1/1984 | Wooten |
| 4,622,747 | A | | 11/1986 | Vassar |
| 4,649,652 | A | | 3/1987 | Dickinson et al. |
| 4,662,080 | A | | 5/1987 | Gale |
| 5,253,421 | A | * | 10/1993 | Landmark ................ 33/27.03 |
| 5,692,357 | A | | 12/1997 | McCain |
| 5,782,007 | A | * | 7/1998 | Harris ....................... 33/768 |
| 6,223,443 | B1 | * | 5/2001 | Jacobs ...................... 33/27.03 |
| 6,223,446 | B1 | * | 5/2001 | Potter ........................ 33/764 |
| 7,055,261 | B2 | * | 6/2006 | Nam ......................... 33/760 |
| 7,165,339 | B2 | * | 1/2007 | Webb et al. ................. 33/760 |
| 7,191,530 | B1 | * | 3/2007 | Thibodeaux ............. 33/27.032 |
| 7,222,437 | B2 | * | 5/2007 | Spanski et al. ............. 33/760 |
| 7,228,644 | B1 | * | 6/2007 | Hellem et al. .............. 33/760 |
| 7,254,899 | B2 | * | 8/2007 | Marocco et al. ............ 33/760 |
| 7,350,303 | B2 | * | 4/2008 | Rock et al. .............. 33/366.11 |
| 2005/0246917 | A1 | * | 11/2005 | Webb et al. ................. 33/760 |
| 2006/0053645 | A1 | * | 3/2006 | Rock et al. ............. 33/366.11 |

* cited by examiner

*Primary Examiner*—Yaritza Guadalupe-McCall
(74) *Attorney, Agent, or Firm*—Greenlee, Winner and Sullivan, P.C.

(57) ABSTRACT

A device is provided for measuring and marking shapes to be duplicated. Such shapes can include electrical outlets, window cutouts, stair step cutouts and such features on drywall or similar panels. The device has a base, a linear measure rotatably attached to the base about a point of rotation, the linear measure being capable of measuring a distance to corners of an outline of a feature to be copied and capable of rotating from a designated point through at least an angle defined by the outline of the feature to be copied. A distance indicator operatively associated with the linear measure indicates the distance from the point of rotation to each corner of the feature to be copied, and an angle indicator operatively associated with the linear measure indicates each angle to which the linear measure has been rotated when each distance measurement was taken. The device can also include means for recording the linear and angular measurement for each corner of the feature to be copied so that the feature can be duplicated on another object such as a replacement piece of drywall. Both mechanical and electronic embodiments are provided.

20 Claims, 5 Drawing Sheets

INSTRUMENT FOR DUPLICATING COMPLEX SHAPES

BACKGROUND

Many attempts have been made to simplify the task of copying features such as cutouts for electrical outlets, windows, stair angles, sloping ceilings and the like when preparing wallboard, paneling, floor coverings, ceiling coverings and such large, flat materials for installation.

A number of previous devices consist of adjustable members that can be arranged to form a template of a feature to be copied, and then moved to the object on which the feature is to be copied and used as a template for cutting or marking. U.S. Pat. No. 5,692,357 issued Dec. 2, 1997 to McCain for "Adjustable Template and Jig" describes a template and jig device comprising adjustable bars that can be adjusted to form a template of the feature being copied. U.S. Pat. No. 4,423,555 issued Jan. 3, 1984 to Wooten for "Device for Measuring Cuts in Wall Paneling and the Like" also describes a device having adjustable members that can be laid over the feature to be copied and adjusted to conform to it, and then placed as a template on the drywall or other object on which the feature is to be copied. U.S. Pat. No. 4,662,080 issued May 5, 1987 to Gale for "Panel Measuring and Layout Tool" describes a device comprising stacked telescoping legs which can be adjusted to form a template. U.S. Pat. No. 2,599,050 issued Jun. 3, 1952 to Emerson discloses a device having a frame and clamp, and a plurality of profile templates which can be aligned with edges of a feature to be copied, to form a template to be laid over the object on which the feature is to be copied. U.S. Pat. No. 4,285,135 issued Aug. 25, 1981 to Minozzi, Jr. for "Panel Cutting Guide" describes a device comprising a vertical rod with adjustable arms for forming a template of a feature to be copied. U.S. Pat. No. 4,649,652 issued Mar. 17, 1987 to Dickinson et al. for "Device for Installing an Article on a Vertical Surface" discloses a device for installing drapery brackets or other articles on a vertical surface comprising a frame with punches, including a retractable measuring device.

Other previous devices are devices for tracing features to be copied by providing a movable guide that is moved along the features to be copied, and that is connected to a marker that traces the outline of the feature on the object on which the feature is to be copied. U.S. Pat. No. 1,577,569 issued Mar. 23, 1926 to Donley for "Gauge and Scribing Tool discloses a measuring device having a pencil slidably mounted thereon. U.S. Pat. No. 2,726,451 issued Dec. 13, 1955 to Johnson for "Tool for Marking Tile" describes a tracer bar mounted on a guide system for tracing the outlines of stair edges and other irregular features so that tiles may be cut to fit such features. U.S. Pat. No. 2,796,665 issued Jun. 25, 1957 to Cossock for "Floor Covering Marker" discloses a device having a supported, slidable bar with a tracer on one end and a scriber on the other so that jagged edges can be reproducibly traced on an object to be cut to fit the edges. U.S. Pat. No. 4,622,747 issued Nov. 18, 1986 to Vassar for "Cutting Device and Method for Profiling Sheet Material" discloses a device shaped like a compass having a tracer leg and a scriber leg for tracing a shape to be cut.

Most of these previous devices have many moving parts that must be capable of being moved with respect to each other, and also kept fixed with respect to each other while transferring to the object on which a feature is to be copied. Each adjustment thereby becomes an occasion for possible error. Furthermore, the devices are awkward to handle and move.

SUMMARY

A device is provided for measuring and marking shapes to be duplicated. Such shapes can include electrical outlets, window cutouts, stair step cutouts and such features on large flat materials such as drywall or similar panels, floor coverings such as carpet, tile, linoleum, ceiling covers, counter tops, and the like during initial construction or when it is necessary to replace such materials. The device can also be used for measuring and marking of layouts for foundations, playing fields, landscaping and the like. Any shape can be copied using the methods and devices hereof, including open or closed rectangles, squares, polygons, irregular polygons, star shapes, or any other shape defined by angles and straight lines. In addition, curved edges can be approximated by making a plurality of measurements defining the curve. This simple device is easy to use for measuring, recording and transferring information from a feature to be copied to another surface.

The device comprises a base and a linear measure, such as an extendable tape measure or laser pointer, rotatably attached to the base at a point of rotation. The base is preferably circular, semi-circular, or quarter-circular in shape. The linear measure is capable of measuring the distance from its center of rotation to all corners of an outline of a feature to be copied. The feature to be copied can be a cutout for an electrical outlet, a cutout for a window, an irregular edge, such as cutouts for stair steps, or any other feature to be copied on an object such as a replacement drywall or panel, or on the ground. The linear measure is capable of rotating on a center of rotation on the base through 360° or at least through an angle defined by the outline of the feature to be copied. The center of rotation is the 0 point for the linear measure, which can be in the form of a tape measure, string, or other linear measure known to the art.

The device further comprises an angle measurement indicator operatively associated with the linear measure for indicating the angle from a reference point through which the linear measure has turned. In an embodiment, the base is marked with angle measurement indicator markings, or a circular angle measurement indicator is positioned atop the base so that the center of rotation of the linear measure is at the center of the circular angle measurement indicator, and marked with angle measurement indicator markings, preferably from 0° to 360°, 0° typically being the reference point from which the user measures the angle to which the linear measure has rotated when it measures the distance to a given corner of the feature being measured.

The device also comprises a distance indicator operatively associated with the linear measure for indicating the distance from the point of rotation to each corner of the outline of the feature to be copied. The distance indicator can comprise markings on a linear measure that is a tape measure in inches, centimeters or the like. The distance indicator can also comprise means for electronically sensing and recording a distance measured, e.g., a switch, angle and distance indicator lights, a processor operatively connected to the foregoing elements, and associated wiring and power supply.

In the embodiment where distance is measured by means of a laser, the distance indicator can comprise a laser beam generator, a laser reflector, a receiver for the laser beam and a processor for calculating the distance between the laser beam generator and reflector and the angle from a zero point that the laser beam makes as it extends to the reflector.

In one embodiment, the linear measure comprises a housing enclosing a tape measure. The housing is rotatably connected to the base. This connection may be through a rotatable platform rotatably connected to the base and fixedly connected to the housing.

In embodiments in which the measurement is done by laser, the housing can contain the laser beam generator, and associated electronics.

The device can also comprise framing members set at right angles to each other so that it can easily be positioned in a corner between two walls. The framing members can be marked with measurement units in inches or other convenient units. Alternatively, the device simply has edges that make a right angle, and these right-angle edges can be marked with measurement units. Retractable, extendable bars can be disposed within the framing members or within the right-angle edges of the device as aids in positioning the device and for greater accuracy in determining whether or not a corner, such as a corner of the floor of a room, is an exact right angle. The tips of the retractable, extendable bars can also be used as reference points to orient the device in situations where it is impractical to use a right-angle corner of a room. For example, there may be an obstruction between the corner of the room and the feature to be measured, which would necessitate positioning the device out from the corner of the room at a point where the linear measure is able to extend directly in a straight line to the corners of the feature to be measured.

In an electronic embodiment of the device, it can comprise a switch to be activated by the user when the linear measure has been extended to reach a corner of the feature to be copied. This sends an electronic signal to the processor informing it of the angle from 0° and the distance the linear measure is extended, so that the processor can record this measurement. The processor comprises a sensor for receiving the signal activated by the switch. A display operatively connected to the processor displays the measured distance and angle. In one embodiment the display is a digital display.

In the electronic embodiment, the device can also comprise at least one function button for switching the device to a mode in which stored measurements can be recalled.

The electronic embodiment of the device can also comprise a distance indicator, such as a light for signaling a user when the linear measure has again been extended to a pre-recorded measured distance and an angle indicator light for signaling a user when the linear measure has again been rotated to a pre-recorded measured angle.

A non-electric embodiment of the device of this invention can be assembled using off-the-shelf and easily-manufactured components, for example, by providing a base, marking the base with angle markings, and rotatably attaching to the base at a point of rotation a retractable, extendable linear measure marked with distance markings.

An electronic embodiment can also be assembled using off-the-shelf and easily-manufactured components, for example by providing a base, rotatably attaching to said base about a point of rotation a linear measure, placing a processor in signal communication with the linear measure, placing a switch in signal communication with the processor and linear measure to activate signal communication between the processor and the linear measure and cause the processor to store a distance and angle measurement corresponding to the distance the linear measure is extended and the angle at which it is extended when the switch is activated, placing a function button in signal communication with the processor for signaling the processor to retrieve the distance and angle measurement, and placing an indicator, such as an indicator light, sound, or other indicator known to the art in signal communication with the processor and the linear measure to indicate when a distance and angle measurement has been duplicated by the linear measure.

To operate the device, in an embodiment, the user simply measures and records, for each corner of an outline of a feature to be measured, the distance from the point of rotation of the linear measure to the point to which the linear measure has been extended, and the angle to which the linear measure has been rotated, positions the device in a corresponding position with respect to an object on which the feature is to be copied, marks the object on which the feature is to be copied with points having the same distance and angular measurements as those measured recorded for each corner of the feature to be copied, and optionally draws a line between these points to form an outline of the feature to be copied. The user can then cut the object along lines between the points to duplicate the feature to be copied.

DETAILED DESCRIPTION

Figure 1:
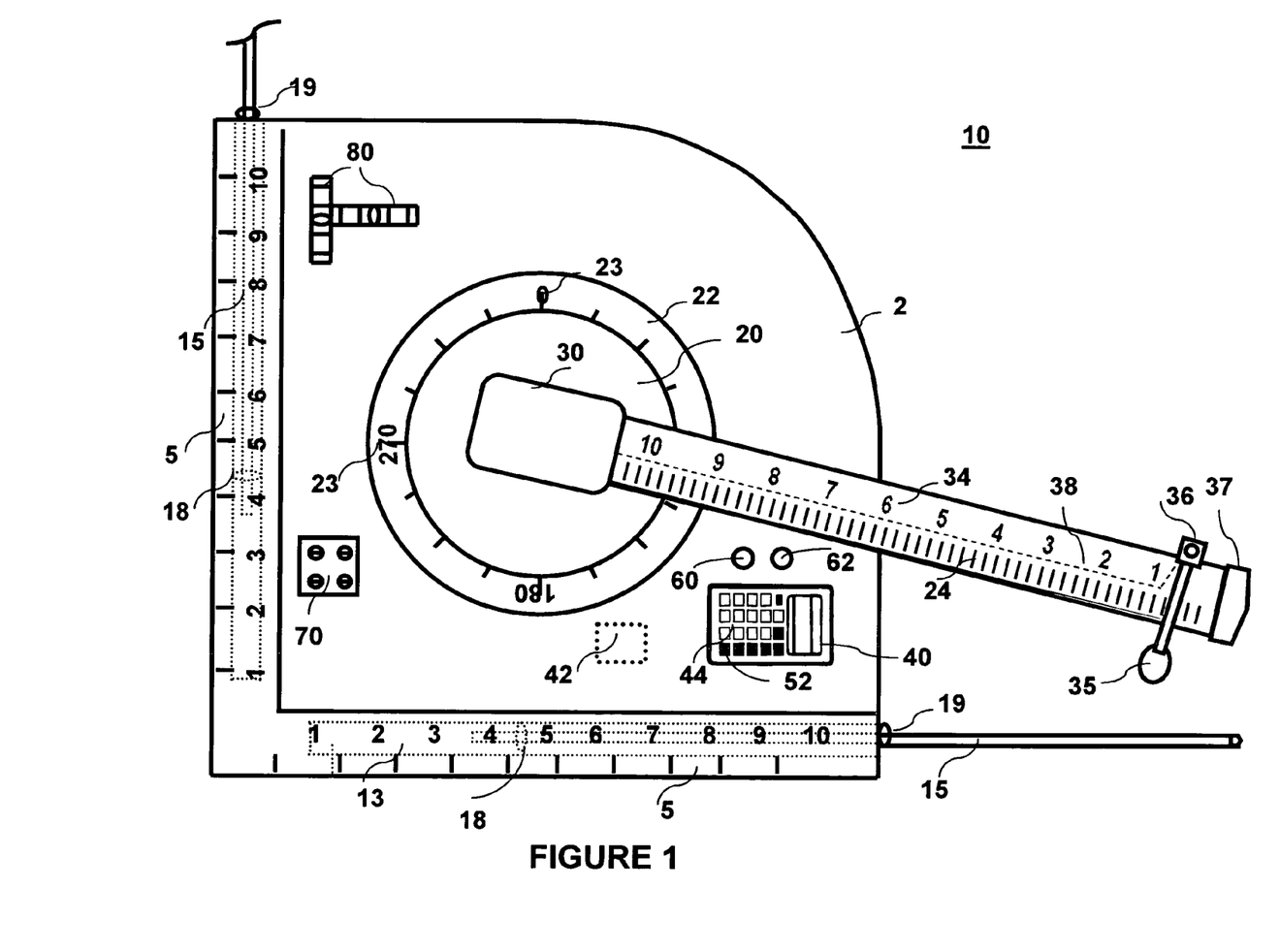
FIG. 1 is a plan view of the device for measuring and marking shapes to be duplicated.

As shown in FIG. 1, in one embodiment, the device 10 comprises a base 2, attached to framing members 5 at right angles to each other. The framing members comprise channels 13 in which are disposed retractable extendable bars 15. The bars are equipped with projections 18 to prevent them from being completely removed from channels 13 and locking devices 19 to lock the extendable bars 15 in place once they have been extended.

The measurement assembly of the instrument is rotatably attached to base 10 and comprises rotatable platform 20, which is fixedly attached to housing 30 containing retractable extendable linear measure 34, the inner end of which is fixed in housing 30, and the outer end of said linear measure 34 extending from housing 30. The free end of linear measure 34 terminates at pointed end 37. Linear measure 34 is also equipped at its free end with switch 36 operatively connected to a conductive wire 38 for transmitting a measurement signal representative of the distance to which linear measure 34 has been extended when switch 36 is activated, and for also transmitting an angle signal representative of the angle from 0° at which linear measure 34 extends when switch 36 is activated. The linear and angle measurement signals are sent from switch 36 to processor 42, which stores these signals and sends a distance measurement display signal and an angle measurement display signal to digital display 40 where the distance and angle measurement values are displayed.

Linear measure 34 is also equipped with handle 35 for use in manually extending linear measure 34. Base 2 is equipped with angle measurement markings 23 on a circular angular measurement indicator 20 so that the angle of linear measure 34 can be directly read from the position of linear measure 34 on base 2. Linear measure 34 is also equipped with distance markings 24, e.g., in inches and feet, as well as in metric units, so that the distance it has been extended can be directly read.

In one embodiment, the device of this invention is entirely mechanical, i.e., non-electronic. In this embodiment, there are no electronic features such as switches, power supplies, digital displays, processors, indicator lights or function buttons.

Figure 5:
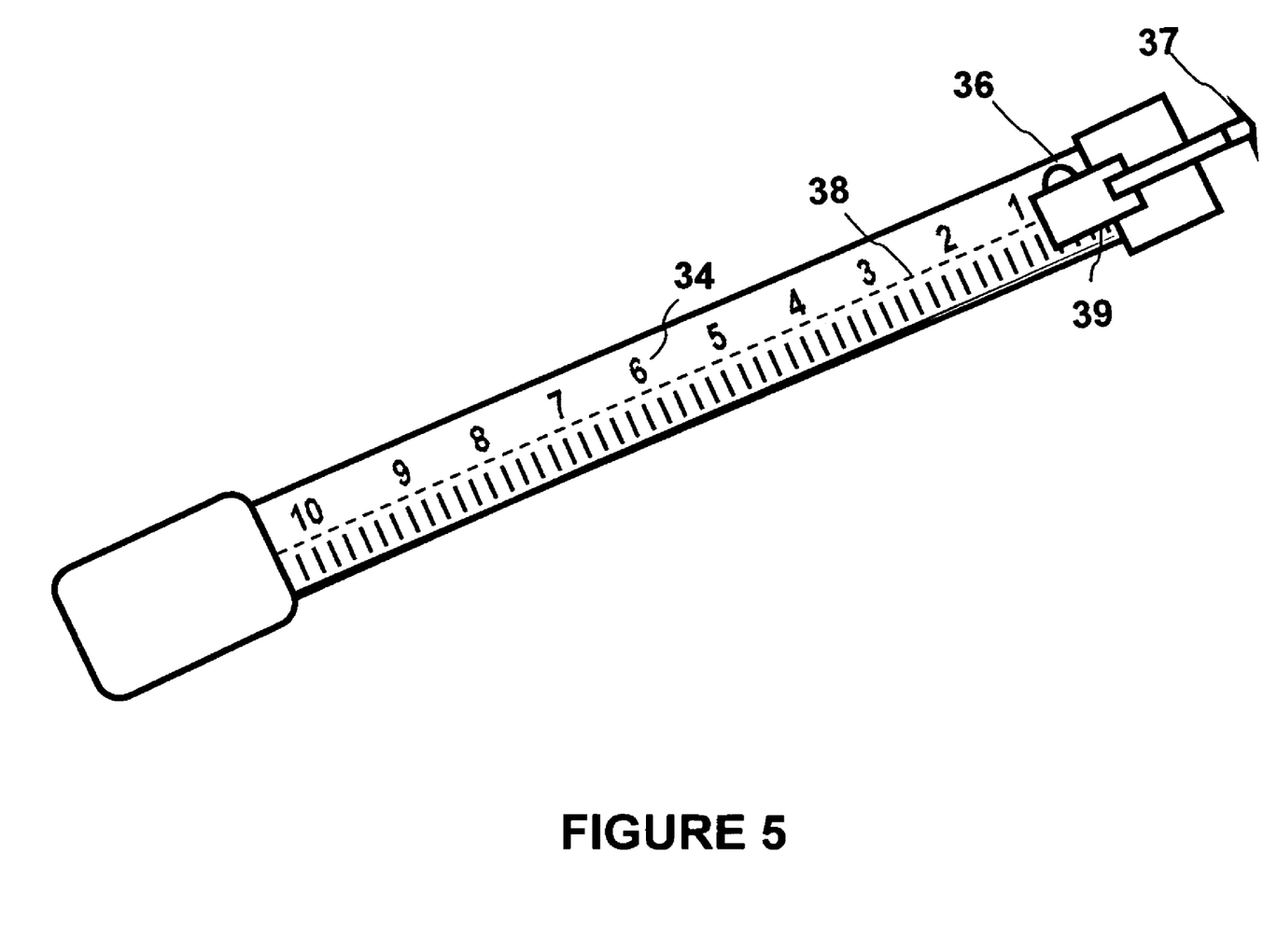
FIG. 5 shows an embodiment in which the linear measure equipped at its free end with a point-and-click switch for sending a signal to store the distance and angle measurements corresponding to the position of the pointed end of the linear measure.

In an electronic embodiment of the invention, function button 52 is operable by the user to instruct processor 42 to recall and display measurements previously taken and stored in the processor. As shown in FIG. 5, the free end of linear measure 34 is equipped with a point-and-click switch 36, shown in housing 39 that is equipped with electronics to allow the user to simply move the pointed end 37 to a corner of the shape to be copied and click the point-and-click switch to send a signal through conductive wire 38 to processor 42 for storing the distance and angle measurements. The device may also comprise additional function buttons shown on control panel 44 programmed to be operable by the user to instruct processor 42 to perform and display various other functions, such as calculation of the area of closed features to be copied, e.g., electrical outlet 14 seen in FIG. 2, measured by the device. Alternatively, the device can be used to measure the corners of an entire area to be covered and calculate the area, which is useful to give an indication of how much material must be purchased to cover the area. Angle indicator light 60 is red and activates automatically when an angle previously measured is being recalled. Distance Indicator light 62 is green and activates when a distance previously measured is being recalled.

In an alternative embodiment, the linear measure 34 can be controlled by a switch with associated electronics placed in a location other than on the free end of linear measure 34, such as on housing 30, whereby clicking the switch extends linear measure toward a corner of the shape to be copied, and when pointed end 37 is adjacent to that corner, the switch, or another switch, is again activated to send the measurements to processor 42.

Attachment bracket 70, shown with screws placed in screw holes therein, is used for fixedly attaching the device to a stand or wall or tripod or other supporting feature. The device can also be equipped with horizontal and vertical levels 80.

The electronic embodiments of this device are also equipped with a power supply (not shown), e.g., a battery or connection to an AC power source.

Figure 2:
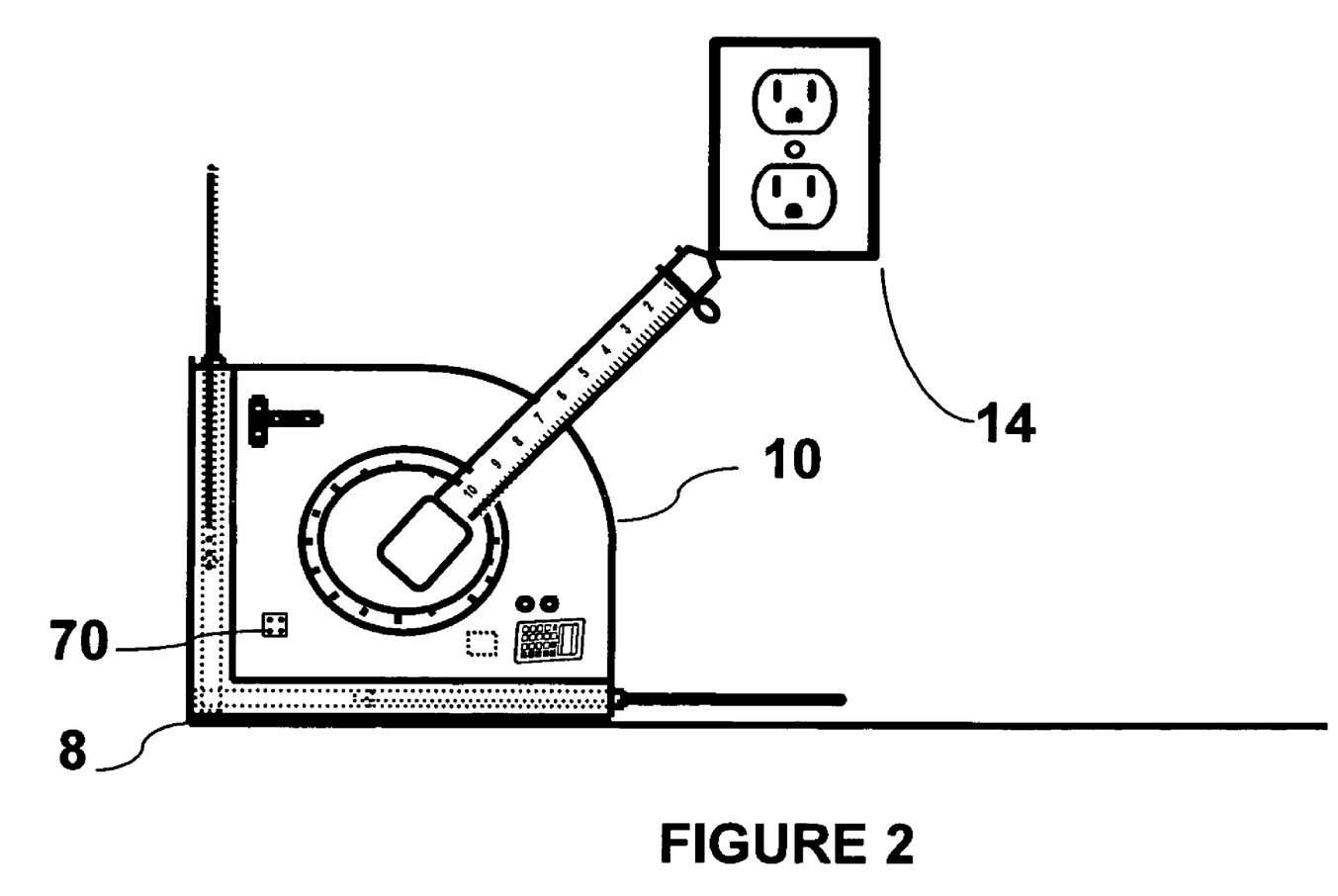
FIG. 2 shows the device of FIG. 1 positioned so as to measure an electrical outlet so that a cutout for the outlet on a replacement sheet of drywall can be made.

As shown in FIG. 2, in use the device 10 is fixedly placed in relation to a feature to be measured. For example, in fitting drywall, an electrical outlet 14 needs to be measured so that a cutout can be made in the right position in the replacement drywall. To place the instrument for use, it is set up vertically against the wall in a corner of the room 8. It can be affixed to the wall by any means known to the art, and in one embodiment it can be screwed to the wall using the attachment bracket 70.

Once the device is fixedly placed with respect to the feature 14 to be measured, the user rotates the measurement assembly (comprising rotatable platform 20, housing 30, and linear measure 34) and extends the free end of linear measure 34 until its pointed end 37 reaches a first corner of feature 14 to be measured, in this case the lower left corner of the electrical outlet. The user activates switch 36 to store and display a first measurement which consists of a value for the linear distance that linear measure 34 has extended from housing 30 and a value for the angle from 0° that linear measure 34 makes.

Alternatively, in the non-electronic embodiment of this invention, the user can read the linear distance directly from the markings on linear measure 34 and record them by hand with pencil and paper or other recording means and can read the angle from the angle markings on base 2 and record them by hand with pencil and paper or other recording means.

The process is repeated to make second measurements, extending the pointed end 37 of retractable extendable linear measure 34 to the second corner, e.g., the upper left corner of the electrical outlet 14. The second measurements, consisting of a value for the linear measurement to this second corner, and the angle that linear measure 34 makes when it contacts this second corner, is also stored and displayed, or in the non-electronic embodiment, recorded by hand. The process is repeated for the third and fourth corners of the electrical outlet 14.

When the angles and distances for each corner of each feature to be measured have been measured and stored, or otherwise recorded, the instrument is positioned in an appropriate place relative to the object on which the features are to be duplicated, for example on the lower left corner of a sheet of replacement drywall intended to be placed on the wall bearing the electrical outlet 14 on which sheet of drywall a cutout for the electrical outlet is to be made.

In an electronic embodiment, the device is equipped with a control panel 44 comprising numerous function buttons the user then activates recall function button 52 to recall the data from the measurement of the first corner of the first feature measured. Activation of recall function button 52 sends a signal to processor 42 to recall and send a signal to display 40 to display the first angle measurement. The user then manually pivots the measurement assembly so that linear measure 34 points approximately to where the first angle of the feature to be copied should be placed. Angle indicator light 60 is activated to be red and blinking when linear measure 34 reaches an angle that is within a few degrees of the value of the first angle measured. The blinking of the indicator light 60 becoming more rapid as the value of the first measurement is more closely approached, and the indicator light 60 remains red when the angle of the first measurement is duplicated. If the measurement assembly is pivoted past the value of the first angle measured, the red angle indicator light 60 again begins to blink. The operator also extends linear measure 34 to a distance approximating the value of the distance measured in the first measurement. As the extension of linear measure 34 approaches the distance measured, distance indicator light 62 is activated to be green and blinking. It blinks at a faster and faster rate as the distance linear measure 34 more closely approaches the distance that was measured, until that distance is reached, at which point, the distance indicator light 62 remains green. If the previously-measured distance is exceeded, the distance indicator light again begins to blink. Once the distance indicator light 62 remains green, and the angle indicator light 60 remains red, the user marks the point on the drywall beneath the point of linear measure 34 to show where the first corner of the feature being duplicated on the drywall should be placed.

The user then activates recall function button 52 a second time, which sends a signal to processor 42 to recall and signal display 40 to display the distance and angle data from the measurements for the second corner on the first feature. The user then pulls out linear measure 34 to the angle and distance previously measured, guided by angle and distance indicator lights 60 and 62, and marks the corresponding point on the drywall on which a cutout for the feature is to be made, thus marking the second corner of the outline of the cutout to be made.

The electronic embodiment can comprise a calculator capable of standard calculator functions included in control panel 44, and processor 42 can be programmed to calculate the area of an enclosed shape measured by device 10.

In the non-electronic embodiment, the user extends linear measure 34 to the distance he previously recorded for his second measurement and positions it the angle he previously recorded for the second measurement, and marks the spot on the drywall to indicate the second corner of the cutout to be made.

The process is repeated until all previous measurements have been recalled and marked on the drywall. The user can then use the points marked to define the feature on the drywall, and can cut out the shape defined by these points. It will be understand that the shape need not be rectangular as shown, but can be any shape defined by corners that can be measured and marked.

Figure 3:
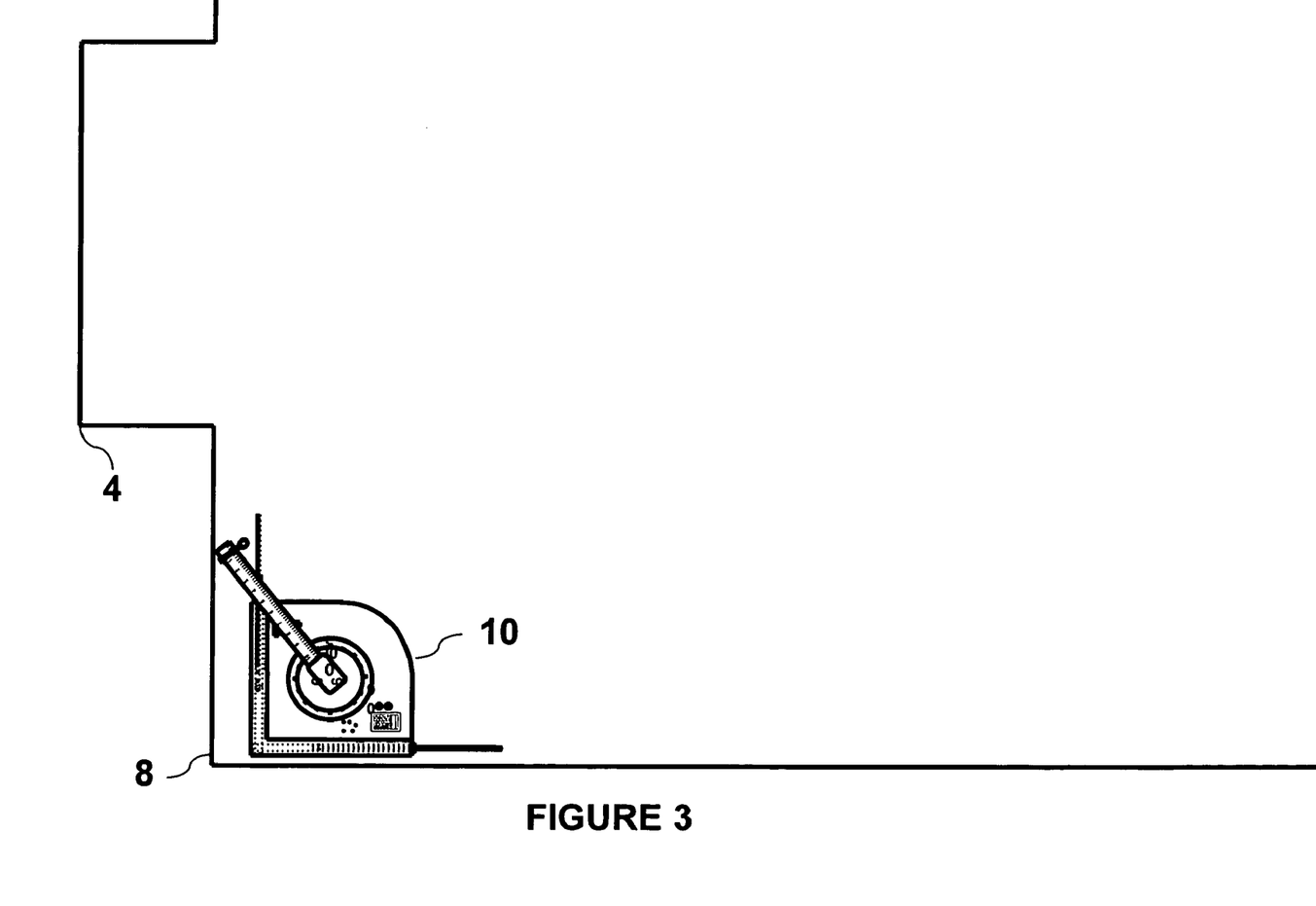
FIG. 3 shows the device positioned in a first corner of a room such that it is blocked from measuring a recessed second corner.

FIG. 3 shows the device 10 positioned near a first corner of a room such that it is blocked from measuring a recessed second corner 4 which might, for example be a corner of a stairwell. In this example, the shape of the floor is being measured so as to cut and fit a suitable piece of carpet. Because the linear measure 34 is blocked by the wall from extending directly into second corner 4, it cannot measure the distance and angle to second corner 4.

Figure 4:
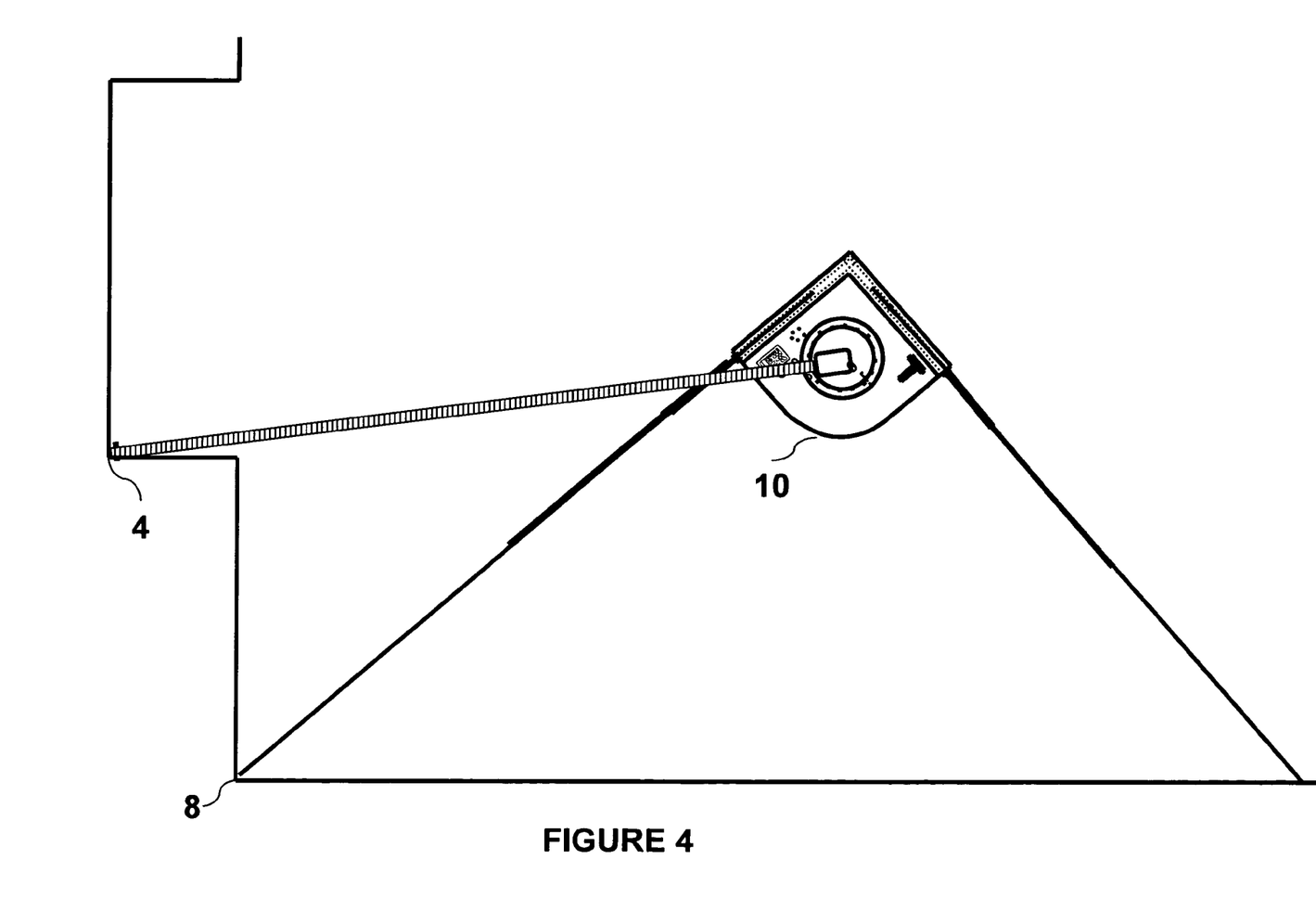
FIG. 4 shows the device positioned such that it is spaced away from the first corner using the retractable extendable bars so that it can measure the recessed second corner.

This problem is solved by extending rectractable, extendable bars 15 as shown in FIG. 4 so as to position the device such that it is spaced away from the first corner 8 and placed in a location from which it can measure recessed second corner 4. The end of one retractable, extendable bar 15 is placed in first corner 8 so as to provide a reproducible reference point for positioning the device correspondingly on the carpet to be cut. The retractable, extendable bars can be made extendable and retractable by making them foldable or telescoping, or by other means known to the art.

The carpet to be cut is then laid out and the device is placed in an equivalent position on the carpet to that in which it was placed to take the measurements, from which it the linear measure can be extended in a straight line to the corners to be marked on the carpet. The corners are then marked and the carpet is cut to the correct shape to fit into the previously measured floor shape.

As will be apparent to those skilled in the art, rather than being positioned to one side of a feature to be measured, the instrument can alternatively be positioned within or directly in front of or behind a feature to be measured. The measuring assembly is capable of being pivoted 360 degrees, and the distance and angle for each corner on the perimeter of a feature to be measured can be measured. Additional measurements can be made to points within the feature to be copied, so that these too can be recalled and marked on the object on which the shape of the feature is to be copied.

Also as appreciated by those skilled in the art, a hole need not be cut in the object in the shape that is measured and marked, but the shape that is measured and marked can be painted, cut out and used elsewhere, foundation walls can be laid on the shape, the shape can be marked on the earth and dug out, or a shape can be duplicated for any imaginable purpose. For example, the device can be used to calculate the area of a feature, mark off building foundations or room dividers by inputting scaled-up dimensions from a blueprint, or mark off areas such as ball courts, for baseball, croquette, volleyball, and so on. It can also be used to mark locations for garden designs using a written plan. In embodiments including a processor, the processor can be programmed to perform the scale-up operations.

Also, as will be appreciated by those skilled in the art, the device is not limited to the features and methods illustrated above, but can be equipped with equivalent features and used in equivalent ways to perform the same and related functions. The scope of this invention is limited only by the appended claims and equivalents of the features and methods set forth therein.

The device described herein is a multifunctional tool. In addition to its usefulness for copying patterns, it can serve as a linear measuring device, a square for measuring right angles, an angle measurement device, a calculator, and a level measurement device. When used with the levels 80 it can determine the slope (pitch) of a roof, ceiling or driveway, or other structure. Thus the device hereof can replace a number of commonly-used construction tools.

The invention claimed is:

1. A device for measuring and marking shapes to be duplicated comprising:
    a base comprising two straight edges that meet at a right angle;
    retractable, extendable bars extending outward from each of said two edges away from said right angle, for use in positioning the device;
    a linear measure rotatably attached to said base about a point of rotation;
        said linear measure being capable of measuring a distance to all corners of an outline of a feature to be copied; and
        said linear measure being capable of rotating through an angle of 360°;
    a distance indicator operatively associated with said linear measure for indicating the distance from the point of rotation to each corner of the feature to be copied;
    an angle indicator operatively associated with said linear measure for indicating each angle from a reference point to which said linear measure has been rotated when said distance indicator indicates the distance from the point of rotation to each corner.

2. The device of claim 1 wherein said linear measure is a rotatable, extendable linear measure.

3. The device of claim 2 wherein said linear measure comprises:
    a housing; and
    a tape measure within said housing.

4. The device of claim 3 wherein said housing is rotatably connected to said base.

5. The device of claim 4 wherein said housing is rotatably mounted on said base through a rotating platform to which it is fixedly attached, said rotating platform being rotatably attached to said base.

6. The device of claim 2 also comprising:
    a switch to be activated by the user to send a signal when the linear measure has been extended to reach a corner of the feature to be copied;
    a processor for receiving the signal activated by said switch to record said distance to which the linear measure has been extended and the angle to which the linear measure has been rotated when the switch is activated; and
    a digital display for displaying said distance and angle, said digital display being operatively connected to said processor.

7. The device of claim 6 also comprising a function button for switching the device to a mode in which stored measurements can be recalled.

8. The device of claim 7 also comprising a distance indicator light for signaling a user when the linear measure has again been extended to said distance and an angle indicator light for signaling a user when the linear measure has again been rotated to said angle.

9. The device of claim 1 wherein said linear measure is marked with distance measurement marks.

10. The device of claim 1 also comprising slidable angle markers that in use can be positioned to mark angles on said base corresponding to specific angle measurements taken with said device.

11. The device of claim 1 wherein said base is attached to framing members set at right angles to each other.

12. A method of making a device of claim 1 comprising:
providing a base comprising two straight edges that meet at a right angle;
equipping said base with retractable, extendable bars extending outward from each of said two edges away from said right angle, for use in positioning the device;
marking said base with angle markings; and
rotatably attaching a retractable, extendable linear measure marked with distance markings to said base at a point of rotation such that it can rotate through an angle of 360°.

13. A method of making a device of claim 1 comprising:
providing a base comprising two straight edges that meet at a right angle;
equipping said base with retractable, extendable bars extending outward from each of said two edges away from said right angle, for use in positioning the device;
rotatably attaching a linear measure to said base about a point of rotation such that it can rotate through an angle of 360°;
placing a processor in signal communication with said linear measure;
placing a switch in signal communication with said processor and linear measure to activate signal communication between said processor and said linear measure and cause said processor to store a distance and angle measurement corresponding to the condition of said linear measure when the switch is activated;
placing a function button in signal communication with said processor for signaling said processor to retrieve the distance and angle measurement;
placing an indicator in signal communication with said processor and said linear measure to indicate when said distance and angle measurement has been duplicated by said linear measure.

14. A method of using a device of claim 1 comprising:
measuring and recording the distance from said point of rotation to which said linear measure has been extended, and the angle from said zero point to which said linear measure has been rotated for each corner of an outline of a feature to be copied;
making markings indicating said distance and angle for each said corner on an object upon which said feature is to be copied;
copying said feature on said object, using said markings.

15. A device for measuring and marking shapes to be duplicated comprising:
a base marked with angle markings and comprising two straight edges that meet at a right angle;
retractable, extendable bars extending outward from each of said two edges away from said right angle, for use in positioning the device;
a platform rotatably attached to said base;
a housing for a linear, extendable measure fixedly attached to said rotating platform;
a retractable, extendable linear measure marked with distance markings mounted within said housing; and
said linear measure being capable of measuring the distance to corners of an outline of a feature to be copied; and
said linear measure being capable of rotating from a designated reference point through at least an angle of 360°.

16. The device of claim 15 wherein said retractable, extendable bars are disposed within edges of said base.

17. A device for measuring and marking shapes to be duplicated comprising:
a base comprising two straight edges that meet at a right angle;
retractable, extendable bars extending outward from each of said two edges away from said right angle, for use in positioning the device;
a linear measure rotatably attached to said base about a point of rotation;
said linear measure being capable of measuring a distance to a corner of an outline of a feature to be copied; and
said linear measure being capable of rotating from a designated reference point through at least an angle of 360°, and being capable of measuring the angle said linear measure has rotated from said reference point when it measures said distance;
a processor for storing said distance and angle measurements;
a switch operatively associated with said processor for signaling said processor to store a distance and angle measurement associated with a corner of said feature;
a function button operatively associated with said processor for signaling said processor to retrieve the distance and angle measurements associated with said corner;
at least one indicator to indicate when a second distance and angle equal to a retrieved distance and angle has been reached by said linear measure.

18. The device of claim 17 also comprising framing members having straight edges at right angles to each other.

19. The device of claim 18 wherein said framing members are marked with distance units.

20. The device of claim 18 wherein retractable, extendable bars extend from the free ends of the framing members.

* * * * *